United States Patent
Hart et al.

(10) Patent No.: US 10,300,530 B2
(45) Date of Patent: May 28, 2019

(54) COOLING STRUCTURES FOR ADDITIVE MANUFACTURING

(71) Applicant: General Electric Company, Schenectady, NY (US)

(72) Inventors: Kassy Moy Hart, Greenville, SC (US); Sandip Dutta, Greenville, SC (US); Srikanth Chandrudu Kottilingam, Greenville, SC (US); David Edward Schick, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 332 days.

(21) Appl. No.: 15/405,668

(22) Filed: Jan. 13, 2017

(65) Prior Publication Data

US 2018/0200790 A1    Jul. 19, 2018

(51) Int. Cl.
| | |
|---|---|
| *B22F 3/105* | (2006.01) |
| *B33Y 30/00* | (2015.01) |
| *B33Y 50/02* | (2015.01) |
| *B23K 26/70* | (2014.01) |
| *B29C 64/153* | (2017.01) |
| *B23K 101/00* | (2006.01) |
| *B29C 64/25* | (2017.01) |
| *B29C 64/364* | (2017.01) |
| *B33Y 10/00* | (2015.01) |
| *B29C 64/245* | (2017.01) |

(52) U.S. Cl.
CPC .......... *B22F 3/1055* (2013.01); *B23K 26/703* (2015.10); *B29C 64/153* (2017.08); *B33Y 30/00* (2014.12); *B33Y 50/02* (2014.12); *B22F 2003/1056* (2013.01); *B23K 2101/001* (2018.08); *B29C 64/245* (2017.08); *B29C 64/25* (2017.08); *B29C 64/364* (2017.08); *B33Y 10/00* (2014.12); *Y02P 10/295* (2015.11)

(58) Field of Classification Search
CPC ..... B29C 64/153; B29C 64/245; B29C 64/25; B29C 64/364; B33Y 50/02; B33Y 10/00; B33Y 30/00
USPC .......................................................... 425/78
See application file for complete search history.

(56) References Cited

U.S. PATENT DOCUMENTS

| | | |
|---|---|---|
| 3,497,173 A | 2/1970 | Valyi |
| 3,997,309 A | 12/1976 | Harris |
| (Continued) | | |

FOREIGN PATENT DOCUMENTS

WO    2015109102 A1    7/2015

*Primary Examiner* — Joseph S Del Sole
*Assistant Examiner* — Lawrence D. Hohenbrink, Jr.
(74) *Attorney, Agent, or Firm* — Ernest G. Cusick; Hoffman Warnick LLC

(57) ABSTRACT

This disclosure provides systems and tooling for cooling components during additive manufacturing. A build plate supports layers of powdered materials as they are positioned and selectively fused to create the component. The build plate defines a build surface and the build surface retracts in a working direction opposite a build direction for the component. At least one vertical cooling structure is provided perpendicular to the build plate and protruding from the build plate as the build surface retracts. The vertical cooling structure cools at least a portion of the component through unfused powdered materials between the vertical cooling structure and the component.

20 Claims, 3 Drawing Sheets

(56) References Cited

U.S. PATENT DOCUMENTS

| | | | |
|---|---|---|---|
| 6,042,774 A * | 3/2000 | Wilkening | B23K 26/34 264/497 |
| 7,261,541 B2 | 8/2007 | Fong | |
| 8,333,922 B2 | 12/2012 | Skoglund et al. | |
| 2007/0241482 A1 | 10/2007 | Giller et al. | |
| 2015/0273631 A1 | 10/2015 | Kenney et al. | |
| 2015/0367415 A1* | 12/2015 | Buller | B23K 26/346 419/53 |
| 2016/0096326 A1 | 4/2016 | Naware | |
| 2016/0096327 A1 | 4/2016 | Fry et al. | |

* cited by examiner

COOLING STRUCTURES FOR ADDITIVE MANUFACTURING

BACKGROUND OF THE INVENTION

The disclosure relates to systems and tooling for cooling components during additive manufacturing and, more specifically, cooling structures within a build chamber.

The pace of change and improvement in the realms of power generation, aviation, and other fields has accompanied extensive research for manufacturing components used in these fields. Conventional manufacture of metallic components generally includes milling or cutting away regions from a slab of metal before treating and modifying the cut metal to yield a part, which may have been simulated using computer models and computer aided design. Manufactured components which may be formed from metal include airfoil components for installation in a turbomachine such as an aircraft engine or power generation system, as well as mechanical components for other manufacturing, transportation, and structural systems.

The development of additive manufacturing, also known in the art as "3D printing," can reduce manufacturing costs by allowing such components to be formed more quickly, with unit-to-unit variations as appropriate. Among other advantages, additive manufacture can directly apply computer-generated models to a manufacturing process while relying on less expensive equipment and/or raw materials.

One form of additive manufacturing allows a component to be formed from a reserve of fine metal powder positioned on a build plate, which is processed by an electron beam or laser (using fusing heat treatments such as sintering or melting) to form a component or sub-component. Additive manufacturing equipment can also form components by using three-dimensional models generated with software included within and/or external to the manufacturing equipment. Some devices fabricated via additive manufacture can be formed initially as several distinct components at respective processing stages before being assembled in a subsequent process.

One challenge in building high-performance metal components may be controlling the heating and cooling of components during the additive manufacturing process. Heating and cooling of metal components or portions thereof may contribute to stress, warping, and changes in material characteristics (heat treatment). Build plates with built in cooling means below the build surface and system configurations for air cooling the component have been proposed.

BRIEF DESCRIPTION OF THE INVENTION

A first aspect of this disclosure provides a system with cooling structures for additive manufacturing. An additive manufacturing tool successively positions layers of powdered materials within a powder bed and selectively fuses the layers of powdered materials to create a component. There is a build plate upon which the layers of powdered materials are positioned and selectively fused to create the component. The build plate defines a build surface and the build surface retracts from the powder bed in a working direction opposite a build direction for the component. At least one vertical cooling structure is perpendicular to the build plate and protrudes from the build plate as the build surface retracts. The at least one vertical cooling structure cools at least a portion of the component through unfused powdered materials between the at least one vertical cooling structure and the component.

A second aspect of the disclosure provides a build chamber for additive manufacturing. A plurality of sidewalls define a work space for an additive manufacturing process. A build plate is perpendicular to the plurality of side walls, further defining the work space and upon which layers of powdered materials are positioned and selectively fused to create a component. The build plate defines a build surface and the build surface retracts through the work space in a working direction opposite a build direction for the component. At least one vertical cooling structure is perpendicular to the build plate and protrudes from the build plate as the build surface retracts. The at least one vertical cooling structure cools at least a portion of the component through unfused powdered materials between the at least one vertical cooling structure and the component.

A third aspect of the disclosure provides a temperature control system for additive manufacturing. There is a temperature controlled build plate upon which layers of powdered materials are positioned and selectively fused to create a component. The build plate defines a build surface and the build surface retracts through a work space in a working direction opposite a build direction for the component. At least one vertical cooling structure is perpendicular to the build plate and protrudes from the build plate as the build surface retracts. The at least one vertical cooling structure cools at least a portion of the component through unfused powdered materials between the at least one vertical cooling structure and the component. A computing system executes program code that independently controls a first temperature of the temperature controlled build plate and at least a second temperature of the at least one vertical cooling structure.

The illustrative aspects of the present disclosure are arranged to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
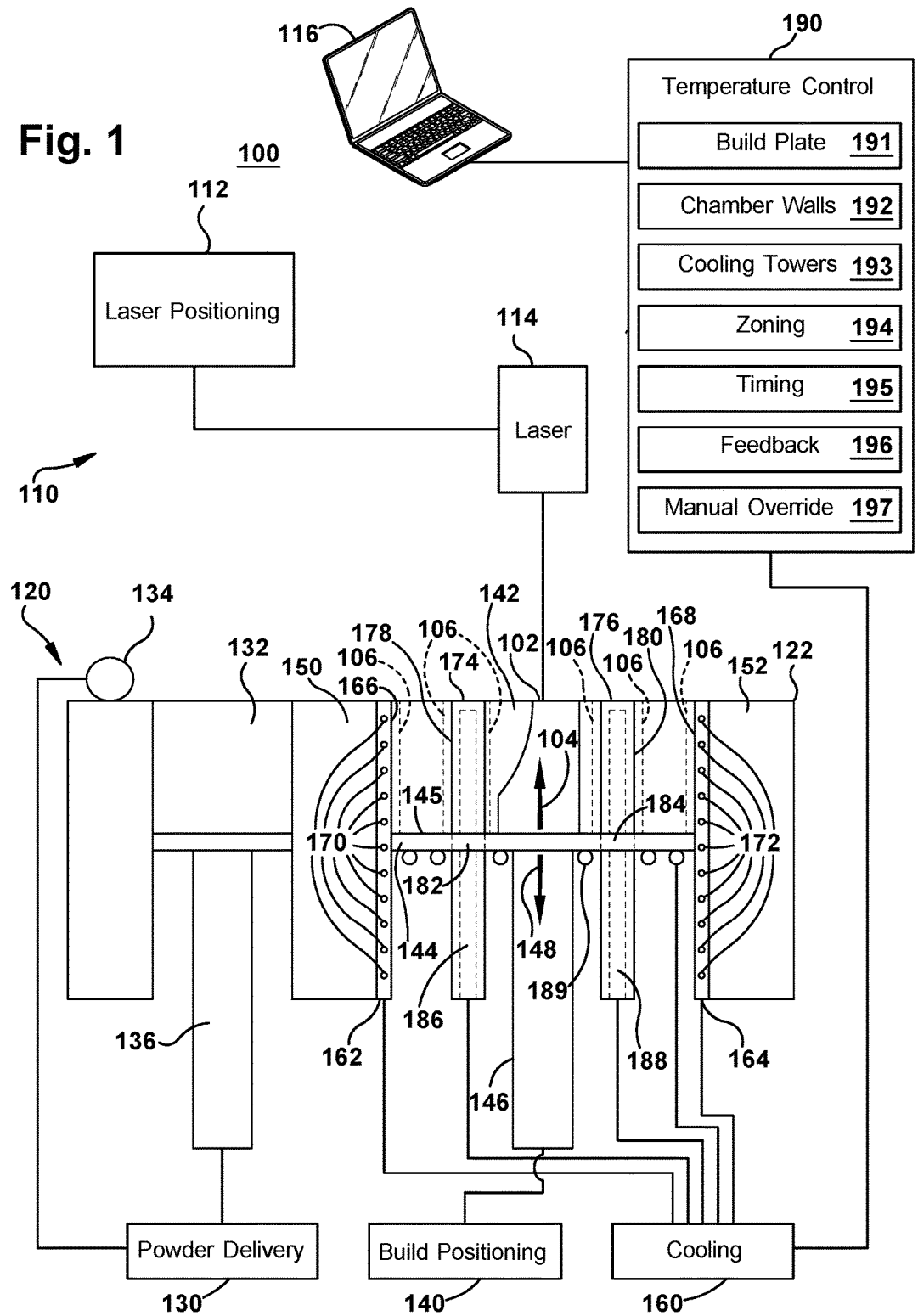
FIG. 1 shows a diagram of an example system for additive manufacturing.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring to FIG. 1, an example system 100 for additive manufacturing of a component 102 is depicted. Component 102 may form part of, or may be adaptable to form part of, a larger component and/or machine. It will be understood, however, that component 102 may have applications other than those described by example herein. Component 102 may have a build direction 104 coincident with the Z axis describing the direction in which materials are added to form the desired structure. In additive manufacture, a "build direction" of one or more components may be defined by a fabricator before raw materials are processed from raw materials into a desired structure. A build direction for a given component and/or sub-component therefore defines the order in which structural features are formed over time as raw materials (e.g., metallic powders) are fused to form a structure. Such materials can include, e.g., one or more pure metals and/or alloys including without limitation: Copper (Cu), Chromium (Cr), Titanium (Ti), Nickel (Ni), aluminum (Al), etc. In an example embodiment, the build direction 104 of component 102 can be oriented along one axis, and perpendicular to the plane of X and Y axis, and generally can be defined to assist in describing the three dimensional structure of the component, as well as the way in which it is formed. Component 102 may include one or more supports manufactured with component 102 to be removed prior to use, assembly, or further manufacturing of component 102.

Component 102 may be built from successive layers of powdered materials that are fused to one another and the preceding fused layers of component 102. Component 102 may initially exist solely as a 3D model or other computer-based instructions for building component 102. These instructions may be provided to an additive manufacturing system 110 including a laser positioning system 112, laser 114, and build stage 120. Build stage 120 may include build positioning system 140 and powder delivery system 130. In some embodiments, laser positioning system 112, powder delivery system 130, and build positioning system 140 may be controlled by computing system 116. Successive layers of unfused powdered materials may be positioned by powder delivery system 130 and laser positioning system 112 may control laser 114 to selectively and controllably fuse the powdered material at desired positions, leaving the remaining powdered material in that layer unfused. In some embodiments, laser positioning system 112 may move laser 114 in a generally X-Y coordinate system and control the timing and duration of laser 114 for selectively sintering powdered materials corresponding to that slice of the desired component shape, as well as any necessary supports. Build stage 120 may include a powder bed 122 with a top surface of powdered materials that provide the working layer for laser 114. In some embodiments, build stage 120 may include a powder hopper 132 for holding powdered materials prior to positioning or distribution across powder bed 122 and distributor 134 for positioning the powdered materials in an even layer in powder bed 122. In the example shown, powder hopper 132 may be a powder well with a delivery piston 136 for pushing a desired volume of powdered materials into powder bed 122 for building each layer of component 102. Distributor 134 may be a mechanical distributor, such as a roller, rake, brush, or sweep arm, that drags and levels powdered materials from powder hopper 132 across powder bed 122. In embodiments with a fixed powder bed, build positioning system 140 may include a recessed build chamber 142 with a moving build plate 144 that retracts from powder bed 122 as successive layers are added to component 102. Build plate 144 may be supported by build piston 146 and move in a working direction 148 that is opposite build direction 104. Build plate 144 may provide a build surface 145 that supports component 102, where the first layer of component 102 may be fused in melting contact with build surface 145 and component 102 may be removed from build surface 145 when the build is complete. Build chamber 142 thereby gets deeper to accommodate the completed portion of component 102 as the build progresses. Build chamber 142 may be defined as the space between sidewalls 150, 152 from powder bed 122 to the maximum depth of build plate 144 in its deepest working position. Build chamber 142 may include additional sidewalls perpendicular to sidewalls 150, 152 and laterally enclosing build chamber 142. In some embodiments, one or more of sidewalls 150, 152 and/or build plate 144 may be removable from build stage 120. System 100 is described herein with regard to direct metal laser melting (DMLM) in a powder bed additive manufacturing system modality. It is understood that the general teachings of the disclosure are equally applicable to other modalities of additive manufacturing now existing or developed in the future.

In the embodiment shown, a number of cooling structures are shown within build chamber 142 and thereby incorporated into build stage 120. The cooling structures may be connected to a common cooling system 160, such as a reservoir of cooling fluid (e.g., water, air, refrigerant, etc.) with pumps and valves for selectively and controllably distributing cooling fluids to each of the cooling structures. In some embodiments, cooling system 160 may incorporate active compressors, heat exchangers, evaporators, or similar systems for adjusting or maintaining the temperatures of cooling fluids distributed to the cooling structures. In some embodiments, cooling system 160 may also have heating capabilities for a wider range of temperature control.

In some embodiments, sidewalls 150, 152 may each incorporate cooling panels 162, 164 on the side facing build chamber 142. Each of cooling panels 162, 164 may provide a cooling surface 166, 168 that defines a side of build chamber 142 and build plate 144 is in moving contact with cooling surfaces 166, 168. Cooling panels 162, 164 may be generally perpendicular to build surface 145 and generally parallel to build direction 104. In some embodiments, each of cooling panels 162, 164 may include a plurality of cooling channels 170, 172 for active cooling of cooling panels 162, 164, respectively. For example, cooling channels 170, 172 may be connected to cooling system 160 for passing cooling fluids through cooling panels 162, 164.

In some embodiments, cooling towers 174, 176 may be freestanding vertical cooling structures within build chamber 142. Each of cooling towers 174, 176 may provide cooling surfaces 178, 180 that defines an unbuildable space within build chamber 142 and build plate 144 is in moving contact with cooling surfaces 178, 180. Build plate 144 may define cooling tower passages 182, 184 through which cooling towers 174, 176 pass to allow build plate 144 to move up and down cooling towers 174, 176 over the course of a build or resetting for a new build. Cooling towers 174, 176 may be generally perpendicular to build surface 145 and generally parallel to build direction 104. In some embodiments and some builds, component 102 may completely surround the lateral perimeter of cooling towers 174, 176. In some embodiments, each of cooling towers 174, 176 may include cooling spaces 186, 188 inside them and separated from build chamber 142 and the unfused powdered materials by cooling surfaces 178, 180. For example, cooling spaces 186, 188 may be a cavity defined by tower walls or comprised of one or more cooling channels disposed within cooling towers 174, 176. Cooling spaces 186, 188 may be connected to cooling system 160 for passing cooling fluids through cooling towers 174, 176. In some embodiments, cooling towers 174, 176 may represent positions within component 102 that correspond to a cavity or through hole and may include a variety of internal features on the internal surfaces of component 102 that face cooling towers 174, 176. In some embodiments, cooling towers 174, 176 may have a variety of cross-sectional shapes and/or surface contours. For example, one or more surfaces of cooling towers 174, 176 may complement a surface or a portion of a surface of component 102.

In some embodiments, vertical cooling structures, such as cooling panels 162, 164 incorporated in sidewalls 150, 152 and cooling towers 174, 176 may each define buffer zones 106 into which powdered materials will be positioned by powder delivery system 130, but which are not eligible for laser sintering and are avoided by laser positioning system 112. Buffer zones 106 surround cooling surfaces 166, 168, 178, 180 to prevent fused materials from adhering to cooling surfaces 166, 168, 178, 180. In some embodiments, buffer zones 106 are defined by a clearance distance from cooling surfaces 166, 168, 178, 180 and that clearance distance may be represented in parameters in the computing system for developing the specifications of component 102 and the control of laser positioning system 112. For example, a clearance distance from cooling surfaces 166, 168, 178, 180 may be defined as 0.05 mm or more and in some embodiments may be in the range of 0.05-5.0 mm. Heat is transferred across buffer zones 106 by the heat conductivity of the unfused materials in buffer zones 106 and other unfused materials between cooling surfaces 166, 168, 178, 180 and component 102. While movement of cooling structures have been described with regard to build plate 144 moving relative to fixed cooling surfaces 166, 168, 178, 180, it may be noted that movement is relative and in some embodiments it may be the cooling surfaces that move relative to a fixed build surface 145.

In some embodiments, build plate 144 may also include cooling channels 189 for controllably cooling build plate 144. Cooling channels 189 may be connected to cooling system 160 for passing cooling fluids through or proximate build plate 144 to cool it.

In some embodiments, cooling system 160 may be controlled by a temperature control system 190 hosted by computing system 116. Computing system 116 may provide computing resources (memory, processing, and I/O) for regulating a plurality of temperature settings for the various cooling structures and, in some embodiments, coordinating those settings with the progress of the build as represented by laser positioning system 112, powder delivery system 130, and build positioning system 140. In some embodiments, computing system 116 is a general purpose computing devices, such as a personal computer, work station, mobile device, or an embedded system in an industrial control system (using general purpose computing components and operating systems). In some embodiments, computing system 116 may be a specialized data processing system for the task of controlling temperature in build stage 120 and may be directly integrated with cooling system 160. In some embodiments, computing system 116 implements temperature control system 190 as computer program code and may include computer program code for other functions as well, including the control of cooling system 160. Computing system 116 may include at least one memory, processor, and input/output (I/O) interface interconnected by a bus. Further, computing system 116 may include communication with external I/O device/resources and/or storage systems, including connected system, such as cooling system 160, laser positioning system 112, powder delivery system 130, and build positioning system 140, and network resources. In general, a processor executes computer program code, such as temperature control system 190, that is stored in memory and/or a storage system. While executing computer program code, the processor can read and/or write data to/from memory, storage systems, and I/O devices. The bus provides a communication link between each of the components within computing system 116. I/O devices may comprise any device that enables a user to interact with computing system 116 (e.g., keyboard, pointing device, display, etc.). Computing system 116 is only representative of various possible combinations of hardware and software. For example, the processor may comprise a single processing unit, or be distributed across one or more processing units in one or more locations, e.g., on a client and server. Similarly, memory and/or storage systems may reside at one or more physical locations. Memory and/or storage systems can comprise any combination of various types of non-transitory computer readable storage medium including magnetic media, optical media, random access memory (RAM), read only memory (ROM), etc. In some embodiments, computing system 116 is a laptop computer in communication with cooling system 160 via a wired (serial, USB, Ethernet, etc.) or wireless (802.11, Bluetooth, etc.) connection and running application software for temperature control system 190.

In some embodiments, temperature control system 190 include a plurality of control modules for independently setting and controlling temperatures for various cooling features. For example, temperature control system 190 may include build plate control 191, chamber wall control 192, and cooling tower control 193. The control modules 191, 192, 193 may allow a user to programmatically set time or build layer (e.g., temperature for layer 1, layer 2 . . . layer n) based cooling profiles for each cooling structure independently. For example, a first temperature profile may be set for build plate 144, a second temperature profile may be set for first sidewall cooling panel 162, a third temperature profile may be set for sidewall cooling panel 164, a fourth temperature profile may be set for cooling tower 174, and a fifth for cooling tower 176. At any given time or build layer, each of the cooling structures may have a different temperature setting. In some embodiments, temperature control system 190 may include a zoning control 194. Zoning control 194 may enable selective grouping of cooling structures to be managed to a common temperature setting. In some embodiments, one or more cooling structures may be divided into a plurality of zones, such as by having multiple cooling channel paths for different areas of the cooling structure. For example, a base plate may be divided into a grid of cooling zones, a cooling panel or tower may be divided into vertical zones (such that cooling may cascade down the panel as the build progresses), and/or a cooling tower may have independently controlled lateral facings. Zoning control 194 may enable the separation and independent control of these various zones or their grouping into coordinated zones, which may or may not be limited to a single cooling structure. In some embodiments, temperature control system 190 may include a timing control 195 for using time or build layer profiles for controlling temperature of the cooling structures. For example, timing control may enable the definition of a continuous temperature profile over the course of the build or may include event-based changes in temperature (e.g., at layer 800 lower chamber wall temperature to X). In some embodiments, temperature control system 190 may include feedback module 196 for receiving feedback from cooling system 160 or another temperature measurement system. For example, cooling elements may incorporate temperature sensors or independent temperature probes may be used on build chamber 142. Feedback module 196 may enable dynamic management of temperature in or near component 102 to a desired set point. In some embodiments, temperature control system 190 may include a manual override 197 that enables the user to manually set temperature values for one or more cooling structures. For example, manual override 197 may enable a user to interrupt the programmatic control of a cooling structure along its build profile if the user notices an anomaly from visual monitoring of the build or feedback from feedback module 196, such as a temperature out of acceptable control parameters.

Figure 2:
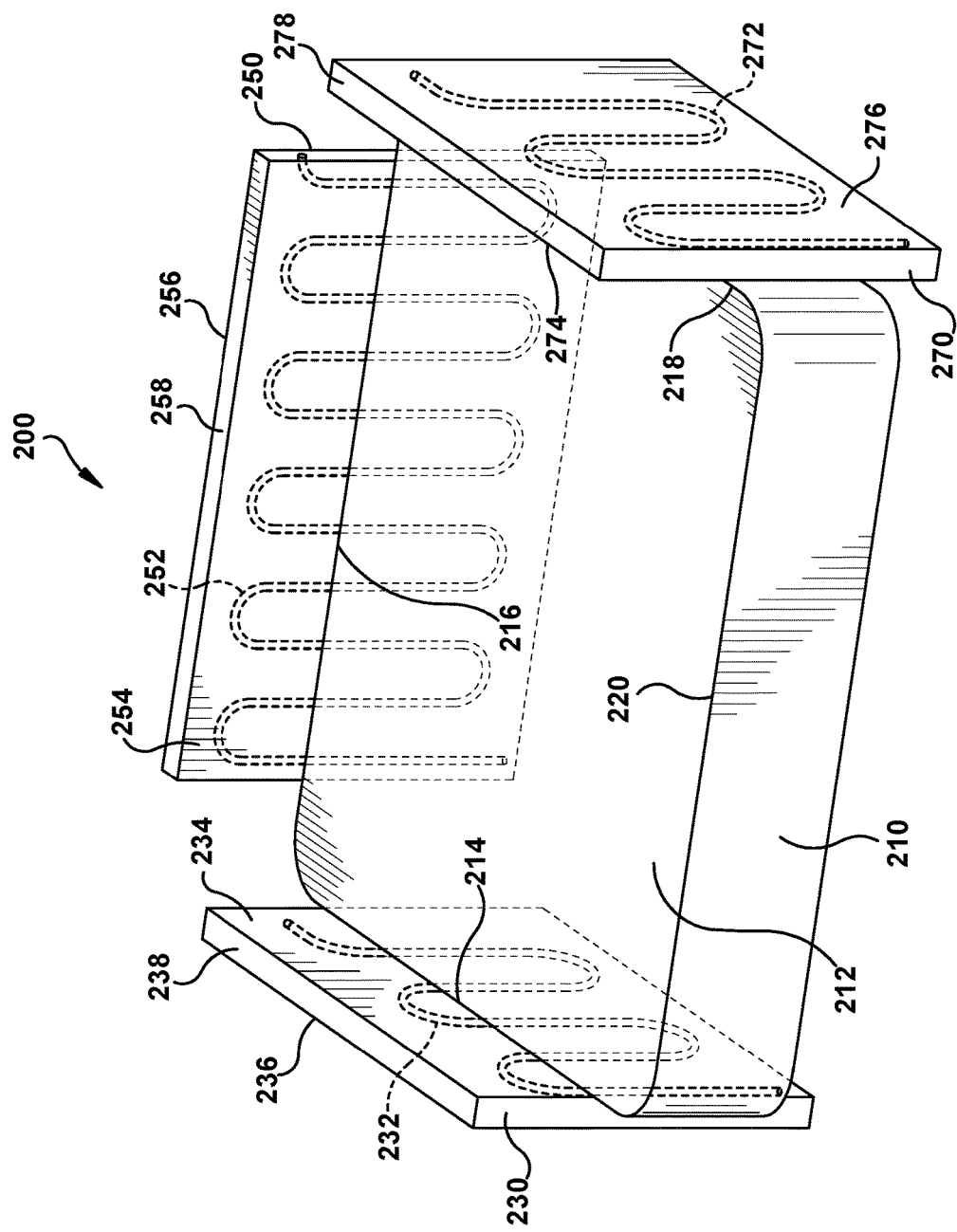
FIG. 2 shows a perspective view of an example build plate with cooling side walls.

Referring to FIG. 2, an example configuration 200 of cooling structures has been disembodied from the build chamber for illustration purposes. A build plate 210 is shown in a partially retracted state surrounded by cooling sidewalls 230, 250, 270. Configuration 200 is shown with only three cooling sidewalls 230, 250, 270. A fourth cooling sidewall may be possible in some configurations and may be moved for the purpose of removing build plate 210 from the build chamber when the build is complete. In the example shown, cooling sidewalls 230, 250, 270 may each be cooling panels similar to cooling panels 162, 164, but with a different configuration of cooling channels 232, 252, 272. In some embodiments, cooling sidewalls 230, 250, 270 may include other cooling mechanisms, such as cooling elements or thermal paths to an active heat sink. Cooling sidewalls 230, 250, 270 may each have respective cooling surfaces 234, 254, 274 facing into the build chamber toward build plate 210 and any component being built on build plate 210. Build plate 210 may define a build surface 212 onto which powdered material may be positioned and a component built by laser sintering successive layers in place. Cooling surfaces 234, 254, 274 may be substantially perpendicular to build surface 212. Build plate 210 may include lateral edges 214, 216, 218, 220. Lateral edge 214 may be in moving contact with cooling surface 234, lateral edge 216 may be in moving contact with cooling surface 254, and lateral edge 218 may be in moving contact with cooling surface 274. Cooling surfaces 234, 254, 274 may be flush with their respective lateral edges 214, 216, 218 with sliding surface contact and/or clearance to allow build plate 210 to move along cooling surfaces 234, 254, 274 without allowing a substantial amount of powdered materials to infiltrate the space between. In the embodiment shown, cooling walls 230, 250, 270 extend substantially along each of lateral edges 214, 216, 218, but not along the full length of the edges. In some configurations, it may not be necessary or desirable for cooling walls to complete surround build plate 210 or enclose its perimeter. In the embodiment shown, cooling channels 232, 252, 272 are embedded within the thickness of cooling walls 230, 250, 270. In an alternate embodiment, cooling channels may be surface mounted on cooling surfaces 234, 254, 274 to more directly contact powdered materials in the build chamber or on distal surfaces 236, 256, 276 to use cooling walls 230, 250, 270 as heat transfer media. In some embodiments, cooling walls 230, 250, 270 are made of heat conducting metal. In the embodiment shown, each cooling wall 230, 250, 270 has continuous cooling channels 232, 252, 272 providing a single zone for cooling control purposes. In some embodiments, cooling channels 232, 252, 272 may each provide multiple independent cooling paths to create zones within each cooling wall 230, 250, 270 that may be independently controlled. Cooling walls 230, 250, 270 each have top surfaces 238, 258, 278 that may align with the powder bed, active layer being built, and or the top most position of build surface 212.

Figure 3:
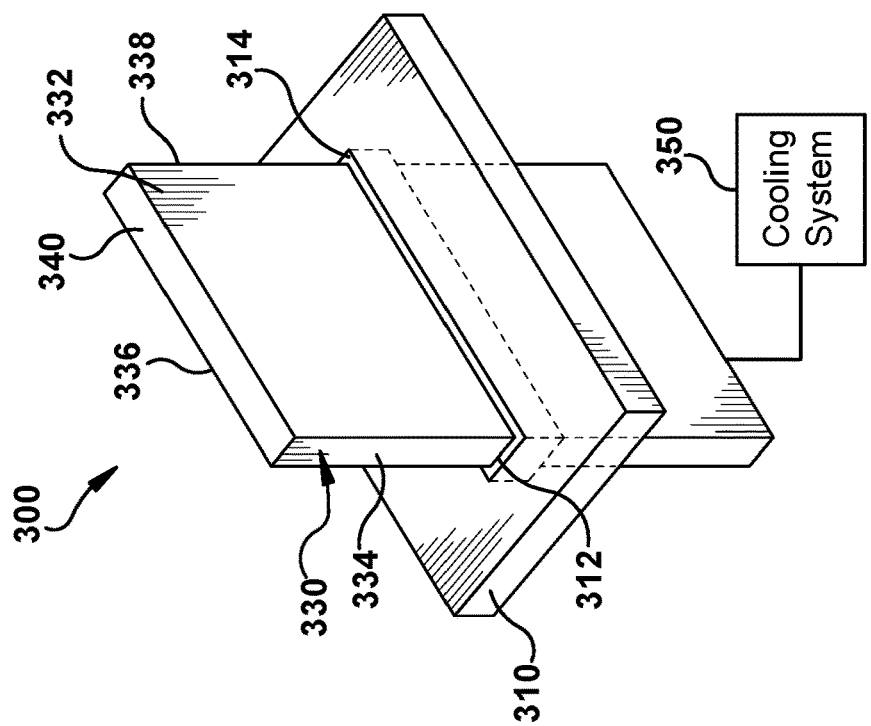
FIG. 3 shows a perspective view of an example build plate with cooling tower.

Referring to FIG. 3, an example cooling tower configuration 300 is shown. Cooling tower 330 passes through build plate 310. In the embodiment shown, cooling tower 330 may have a rectangular cross-section. Other cross-sections may be possible, including other polygons, circles, and more complex shapes. Build plate 310 may define a passage 312 that provides a pass through across the thickness of build plate 310. Passage 312 may have a cross-section that is complementary to the cross-section of cooling tower 330, For example, passage 312 may be a rectangular with identical proportions and only slightly larger dimensions such that cooling tower 330 may be in moving contact with the internal surfaces of passage 312. In the embodiment shown, passage 312 completely surrounds the perimeter of cooling tower 330. In some embodiments, passage 312 may include a gasket 314 between cooling tower 330 and the internal edges of build plate 310 that define passage 312. Gasket 314 may be made of durable, compliant material, such as rubber or another polymer, with surface characteristics that enable sliding contact between gasket 314 and cooling tower 330 while providing a seal sufficient to prevent most unfused powdered material from infiltrating passage 312. In the embodiment shown, passage 312 and cooling tower 330 are shown proximate the middle of build plate 310 and oriented substantially parallel to the rectangular edges of build plate 310. In other embodiments, passage 312 and cooling tower 330 may be in any position and orientation for facilitating the shape of the component to be built. In some embodiments, passage 312 and cooling tower 330 may be adjacent a lateral edge of build plate 310. For example, cooling tower 330 may project from a sidewall (a cooling sidewall or otherwise) and passage 312 may be a complementary cutout along the adjacent lateral edge of build plate 310. Cooling tower 330 may include a plurality of lateral cooling surfaces 332, 334, 336, 338 and a top surface 340. In some embodiments, top surface 340 may align with the powder bed above the build chamber. In some embodiments, top surface 340 may be recessed from the powder bed such that the top surface is covered by powdered materials when a new layer of powdered materials are positioned. For example, top surface 340 may be 5-15 mm below the top surface of the powdered materials in the powder bed. In some embodiments, cooling tower 330 may be a passive cooling element (heat sink) or a thermal path to an active cooling element, such as a solid tower of thermally conductive metal in thermal communication with a chiller or other active cooling element at the base of the tower. For example, cooling tower 330 may be in thermal communication with a cooling system 350, similar to cooling system 160 in FIG. 1. In some embodiments, cooling tower 330 may incorporate an active cooling element disposed in a cooling chamber or space within cooling tower 330. For example, cooling tower 330 may incorporate one or more cooling channels for cooling fluid to move through cooling tower 330 and an external cooling system 350 for actively removing heat from the circulating cooling fluid. Cooling tower 330 may cool the unfused powdered material adjacent cooling surfaces 332, 334, 336, 338 and/or top surface 340 and, thereby, a portion of a component adjacent the unfused powdered materials.

Figure 4:
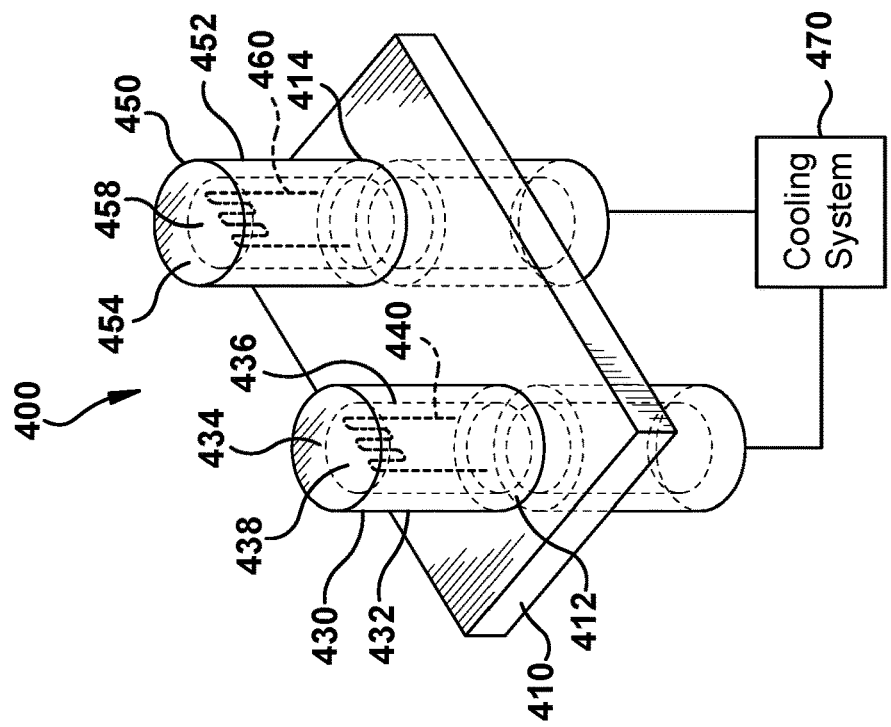
FIG. 4 shows a perspective view of another example build plate with cooling towers.

Referring to FIG. 4, another example cooling tower configuration 400 is shown. Cooling towers 430, 450 pass through build plate 410. In the embodiment shown, cooling towers 430, 450 may have a circular cross-section. Other cross-sections may be possible, including rectangles, other polygons, and more complex shapes and cooling towers 430, 450 need not have the same cross-sectional shape or dimensions. Build plate 410 may define passage 412, 414 that provides a pass through across the thickness of build plate 410. Passages 412, 414 may have cross-sections that are complementary to the respective cross-sections of cooling tower 430, 450. For example, passages 412, 414 may be circles with only slightly larger diameter such that cooling towers 430, 450 may be in moving contact with the internal surfaces of passages 412, 414. In the embodiment shown, passages 412, 414 completely surround the perimeter of cooling towers 430, 450. In some embodiments, passages 412, 414 may include gaskets as described above with regard to gasket 314. In the embodiment shown, passages 412, 414 and cooling towers 430, 450 are shown regularly spaced positions across build plate 410. In other embodiments, passages 412, 414 and cooling towers 430, 450 may be in any position and orientation for facilitating the shape of the component to be built. In some embodiments, one or both of passages 412, 414 and cooling towers 430, 450 may be adjacent a lateral edge of build plate 410. For example, cooling towers 430, 450 may project from a sidewall (a cooling sidewall or otherwise) and passages 412, 414 may be complementary cutouts along the adjacent lateral edge of build plate 410. Cooling towers 430, 450 may each include lateral cooling surfaces 432, 452 and top surfaces 434, 454. In some embodiments, top surfaces 434, 454 may align with the powder bed above the build chamber. In some embodiments, top surfaces 434, 454 may be recessed from the powder bed such that the top surface is covered by powdered materials when a new layer of powdered materials are positioned, whereby top surfaces 434, 454 also act as cooling surfaces. For example, top surfaces 434, 454 may be 5-15 mm below the top surface of the powdered materials in the powder bed. Cooling towers 430, 450 may include tower walls 436, 456 defining lateral cooling surfaces 432, 452 on the exterior of cooling towers 430, 450 and defining cooling spaces 438, 458 in the interior of cooling towers 430, 450. In some embodiments, cooling towers 430, 450 may be in thermal communication with a cooling system 470, similar to cooling system 160 in FIG. 1. In some embodiments, cooling towers 430, 450 may incorporate active cooling elements 440, 460 disposed in cooling spaces 438, 458 within cooling towers 430, 450. For example, cooling elements 440, 460 may be hollow cooling channels for cooling fluid to move through cooling towers 430, 450 and an external cooling system 470 for actively removing heat from the circulating cooling fluid. Cooling towers 430, 450 may cool the unfused powdered material adjacent cooling surfaces 432, 452 and/or top surfaces 434, 454 and, thereby, a portion of a component adjacent the unfused powdered materials.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
    an additive manufacturing tool that successively positions layers of powdered materials within a powder bed and selectively fuses the layers of powdered materials to create a component;
    a build plate upon which the layers of powdered materials are positioned and selectively fused to create the component, wherein the build plate defines a build surface and the build surface retracts from the powder bed in a working direction opposite a build direction for the component; and
    at least one vertical cooling structure perpendicular to the build plate and protruding from the build plate as the build surface retracts, wherein the at least one vertical cooling structure cools at least a portion of the component through unfused powdered materials between the at least one vertical cooling structure and the component.

2. The system of claim 1, wherein the at least one vertical cooling structure includes a cooling surface in contact with the unfused powdered materials and wherein the cooling surface defines a buffer space of the unfused powdered materials along the cooling surface and the component is separated from the cooling surface by the buffer space.

3. The system of claim 1, wherein the at least one vertical cooling structure includes a cooling surface and defines at least one coolant space inside the at least one vertical cooling structure and separated from the unfused powdered materials by the cooling surface.

4. The system of claim 3, further comprising a coolant source connected to the at least one coolant space for controllably providing coolant to the at least one coolant space through at least one coolant channel within the at least one coolant space.

5. The system of claim 1, wherein the at least one cooling structure includes a side wall adjacent the build plate, wherein the build plate has a lateral edge in moving contact with a cooling surface of the sidewall as the build surface retracts in the working direction.

6. The system of claim 1, wherein the build plate defines at least one passage through the build surface and wherein the at least one cooling structure passes through the at least one passage as the build surface retracts in the working direction.

7. The system of claim 6, wherein the at least one passage has a continuous perimeter and the build surface surrounds the continuous perimeter and wherein the at least one cooling structure has a cross-section complementary to the continuous perimeter and a cooling surface in moving contact with the continuous perimeter.

8. The system of claim 1, wherein the at least one cooling structure includes a plurality of cooling structures selected from cooling walls or cooling towers connected to a temperature controller.

9. The system of claim 8, wherein the plurality of cooling structures are independently controlled by the temperature controller to simultaneously provide different levels of cooling to different portions of the component.

10. A build chamber comprising:
a plurality of sidewalls defining a work space for an additive manufacturing process;
a build plate perpendicular to the plurality of side walls further defining the work space and upon which layers of powdered materials are positioned and selectively fused to create a component, wherein the build plate defines a build surface and the build surface retracts through the work space in a working direction opposite a build direction for the component; and
at least one vertical cooling structure perpendicular to the build plate and protruding from the build plate as the build surface retracts, wherein the at least one vertical cooling structure cools at least a portion of the component through unfused powdered materials between the at least one vertical cooling structure and the component.

11. The build chamber of claim 10, wherein the at least one vertical cooling structure includes a cooling surface in contact with the unfused powdered materials and wherein the cooling surface defines a buffer space of the unfused powdered materials along the cooling surface and the component is separated from the cooling surface by the buffer space.

12. The build chamber of claim 10, wherein the at least one vertical cooling structure includes a cooling surface and defines at least one coolant space inside the at least one vertical cooling structure and separated from the unfused powdered materials by the cooling surface.

13. The build chamber of claim 12, further comprising a coolant source connected to the at least one coolant space for controllably providing coolant to the at least one coolant space through at least one coolant channel within the at least one coolant space.

14. The build chamber of claim 10, wherein at least one of the plurality of sidewalls includes at least one cooling structure adjacent the build plate, wherein the build plate has a lateral edge in moving contact with a cooling surface of the sidewall as the build surface retracts in the working direction.

15. The build chamber of claim 10, wherein the build plate defines at least one passage through the build surface and wherein the at least one cooling structure passes through the at least one passage as the build surface retracts in the working direction.

16. The build chamber of claim 15, wherein the at least one passage has a continuous perimeter and the build surface surrounds the continuous perimeter and wherein the at least one cooling structure has a cross-section complementary to the continuous perimeter and a cooling surface in moving contact with the continuous perimeter.

17. The build chamber of claim 10, wherein the at least one cooling structure includes a plurality of cooling structures selected from cooling walls or cooling towers, wherein the plurality of cooling structures are connected to a temperature controller.

18. The build chamber of claim 17, wherein the plurality of cooling structures are independently controlled by the temperature controller to simultaneously provide different levels of cooling to different portions of the component.

19. A temperature control system comprising:
a temperature controlled build plate upon which layers of powdered materials are positioned and selectively fused to create a component, wherein the build plate defines a build surface and the build surface retracts through a work space in a working direction opposite a build direction for the component;
at least one vertical cooling structure perpendicular to the build plate and protruding from the build plate as the build surface retracts, wherein the at least one vertical cooling structure cools at least a portion of the component through unfused powdered materials between the at least one vertical cooling structure and the component; and
a computing system executing program code that independently controls a first temperature of the temperature controlled build plate and at least a second temperature of the at least one vertical cooling structure.

20. The temperature control system of claim 19, wherein the at least one cooling structure includes a plurality of cooling structures selected from cooling walls or cooling towers and the plurality of cooling structures are controllably connected to the computing system, wherein each of the plurality of cooling structures and the temperature controlled build plate are independently controlled by the computing system to simultaneously provide different levels of cooling to different portions of the component.

* * * * *

(12) EX PARTE REEXAMINATION CERTIFICATE (12666th)
United States Patent
Hart et al.

(10) Number: US 10,300,530 C1
(45) Certificate Issued: Aug. 6, 2024

(54) COOLING STRUCTURES FOR ADDITIVE MANUFACTURING

(71) Applicant: General Electric Company, Schenectady, NY (US)

(72) Inventors: Kassy Moy Hart, Greenville, SC (US); Sandip Dutta, Greenville, SC (US); Srikanth Chandrudu Kottilingam, Greenville, SC (US); David Edward Schick, Simpsonville, SC (US)

(73) Assignee: GE INFRASTRUCTURE TECHNOLOGY LLC, Greenville, SC (US)

Reexamination Request:
No. 90/019,436, Mar. 1, 2024

Reexamination Certificate for:
Patent No.: 10,300,530
Issued: May 28, 2019
Appl. No.: 15/405,668
Filed: Jan. 13, 2017

(51) Int. Cl.
| | |
|---|---|
| *B22F 3/105* | (2006.01) |
| *B22F 10/28* | (2021.01) |
| *B22F 12/20* | (2021.01) |
| *B22F 12/30* | (2021.01) |
| *B23K 26/70* | (2014.01) |
| *B29C 64/153* | (2017.01) |
| *B29C 64/25* | (2017.01) |
| *B33Y 30/00* | (2015.01) |
| *B33Y 50/02* | (2015.01) |
| *B22F 10/40* | (2021.01) |
| *B23K 101/00* | (2006.01) |
| *B29C 64/245* | (2017.01) |
| *B29C 64/364* | (2017.01) |
| *B33Y 10/00* | (2015.01) |

(52) U.S. Cl.
CPC ............ *B23K 26/703* (2015.10); *B22F 10/28* (2021.01); *B22F 12/20* (2021.01); *B22F 12/30* (2021.01); *B29C 64/153* (2017.08); *B33Y 30/00* (2014.12); *B33Y 50/02* (2014.12); *B22F 10/40* (2021.01); *B22F 2999/00* (2013.01); *B23K 2101/001* (2018.08); *B29C 64/245* (2017.08); *B29C 64/25* (2017.08); *B29C 64/364* (2017.08); *B33Y 10/00* (2014.12); *Y02P 10/25* (2015.11)

(58) Field of Classification Search
None
See application file for complete search history.

(56) References Cited

To view the complete listing of prior art documents cited during the proceeding for Reexamination Control Number 90/019,436, please refer to the USPTO's Patent Electronic System.

*Primary Examiner* — Elizabeth L McKane

(57) ABSTRACT

This disclosure provides systems and tooling for cooling components during additive manufacturing. A build plate supports layers of powdered materials as they are positioned and selectively fused to create the component. The build plate defines a build surface and the build surface retracts in a working direction opposite a build direction for the component. At least one vertical cooling structure is provided perpendicular to the build plate and protruding from the build plate as the build surface retracts. The vertical cooling structure cools at least a portion of the component through unfused powdered materials between the vertical cooling structure and the component.

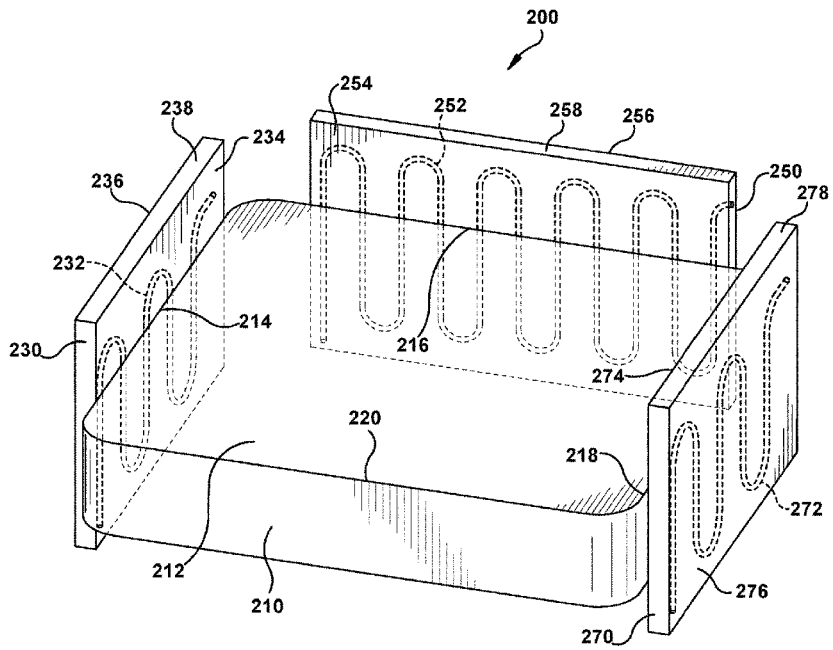

US 10,300,530 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, 6, 8-10, 14, 15 and 17-20 are determined to be patentable as amended.

Claims 2-4, 7, 11-13 and 16, dependent on an amended claim, are determined to be patentable.

1. A system comprising:
   an additive manufacturing tool that successively positions layers of powdered materials within a powder bed and selectively fuses the layers of powdered materials to create a component;
   a build plate upon which the layers of powdered materials are positioned and selectively fused to create the component, wherein the build plate defines a build surface and the build surface retracts from the powder bed in a working direction opposite a build direction for the component; and
   at least one vertical cooling structure perpendicular to the build plate and protruding from *within a periphery of* the build plate as the build surface retracts, wherein the at least one vertical cooling structure cools at least a portion of the component through unfused powdered materials between the at least one vertical cooling structure and the component.

5. The system of claim 1, wherein the at least one *vertical* cooling structure *further* includes a [side wall] *sidewall* adjacent the build plate, wherein the build plate has a lateral edge in moving contact with a cooling surface of the sidewall as the build surface retracts in the working direction.

6. The system of claim 1, wherein the build plate defines at least one passage through the build surface and wherein the at least one *vertical* cooling structure passes through the at least one passage as the build surface retracts in the working direction.

8. The system of claim 1, wherein the at least one *vertical* cooling structure includes a plurality of *vertical* cooling structures [selected from cooling walls or cooling towers] connected to a temperature controller.

9. The system of claim 8, wherein the plurality of *vertical* cooling structures are independently controlled by the temperature controller to simultaneously provide different levels of cooling to different portions of the component.

10. A build chamber comprising:
    a plurality of sidewalls defining a work space for an additive manufacturing process;
    a build plate perpendicular to the plurality of [side walls] *sidewalls* further defining the work space and upon which layers of powdered materials are positioned and selectively fused to create a component, wherein the build plate defines a build surface and the build surface retracts through the work space in a working direction opposite a build direction for the component; and
    at least one vertical cooling structure perpendicular to the build plate and protruding from *and passing through* the build plate as the build surface retracts, wherein the at least one vertical cooling structure cools at least a portion of the component through unfused powdered materials between the at least one vertical cooling structure and the component.

14. The build chamber of claim 10, wherein at least one of the plurality of sidewalls *further* includes at least one *other vertical* cooling structure adjacent the build plate, wherein the build plate has a lateral edge in moving contact with a cooling surface of the sidewall as the build surface retracts in the working direction.

15. The build chamber of claim 10, wherein the build plate defines at least one passage through the build surface and wherein the at least one *vertical* cooling structure passes through the at least one passage as the build surface retracts in the working direction.

17. The build chamber of claim 10, wherein the at least one *vertical* cooling structure includes a plurality of *vertical* cooling structures[selected from cooling walls or cooling towers], wherein the plurality of cooling structures are connected to a temperature controller.

18. The build chamber of claim 17, wherein the plurality of *vertical* cooling structures are independently controlled by the temperature controller to simultaneously provide different levels of cooling to different portions of the component.

19. A temperature control system comprising:
    a temperature controlled build plate upon which layers of powdered materials are positioned and selectively fused to create a component, wherein the build plate defines a build surface and the build surface retracts through a work space in a working direction opposite a build direction for the component;
    at least one vertical cooling structure perpendicular to the build plate and protruding from *within the periphery of* the build plate as the build surface retracts, wherein the at least one vertical cooling structure cools at least a portion of the component through unfused powdered materials between the at least one vertical cooling structure and the component; and
    a computing system executing program code that independently controls a first temperature of the temperature controlled build plate and at least a second temperature of the at least one vertical cooling structure.

20. The temperature control system of claim 19, wherein the at least one *vertical* cooling structure includes a plurality of *vertical* cooling structures [selected from cooling walls or cooling towers] and the plurality of *vertical* cooling structures are controllably connected to the computing system, wherein each of the plurality of *vertical* cooling structures and the temperature controlled build plate are independently controlled by the computing system to simultaneously provide different levels of cooling to different portions of the component.

* * * * *